United States Patent [19]
Narayanaswami

[11] Patent Number: 5,522,020
[45] Date of Patent: May 28, 1996

[54] SYSTEM AND METHOD FOR RAPIDLY DETERMINING RELATIVE RECTANGLE POSITION

[75] Inventor: Chandrasekhar Narayanaswami, Austin, Tex.

[73] Assignee: International Business Machines Corporation, Armonk, N.Y.

[21] Appl. No.: 121,138

[22] Filed: Sep. 14, 1993

[51] Int. Cl.⁶ .................................................. G06T 15/00
[52] U.S. Cl. .......................... 395/133; 395/134; 395/135; 395/157; 395/158
[58] Field of Search ............................ 395/121, 133–139, 395/155, 157, 158, 160, 161, 800

[56] References Cited

U.S. PATENT DOCUMENTS

| | | | |
|---|---|---|---|
| T987,004 | 10/1979 | Fever et al. | 395/134 |
| 4,542,376 | 9/1985 | Bass et al. | 395/158 |
| 4,598,384 | 7/1986 | Shaw et al. | 395/800 |
| 4,769,636 | 9/1988 | Iwami et al. | 395/158 X |
| 4,914,607 | 4/1990 | Takanashi et al. | 395/158 |
| 5,151,974 | 9/1992 | Tani et al. | 395/157 |
| 5,237,653 | 8/1993 | Noguchi et al. | 395/158 |

OTHER PUBLICATIONS

J. D. Foley et al, pp. 111–129. (1991).

*Primary Examiner*—Almis R. Jankus
*Attorney, Agent, or Firm*—Mark S. Walker; Jenkens & Gilchrist

[57] ABSTRACT

A system and method for determining the interaction between two isothetic rectangles without evaluating all vertices of those rectangles. The relative displacement of the rectangles can be expressed as a function of the coordinates of two vertices of each rectangle. A first function based on corresponding vertices results in an unambiguous detection of some interactions but ambiguous detection of others. A second function based on opposite vertices is evaluated in combination with the first function to unambiguously determine all interactions.

9 Claims, 4 Drawing Sheets

SYSTEM AND METHOD FOR RAPIDLY DETERMINING RELATIVE RECTANGLE POSITION

BACKGROUND OF THE INVENTION

1. Field of the Invention

The present invention relates to apparatus and processes for graphics processing systems. More particularly, it relates to apparatus and methods for testing objects displayed on a graphics device to establish the relative positions and interactions of those objects.

2. Background and Related Art

Graphics display systems are used to provide computer system users with information and data in a readily understood form. Many graphics systems display data from different sources or applications in windows on the display screen. Windows are used to implement a "desktop" metaphor allowing the system user to select a window and place it on "top" of the visual desktop making it the active window. Other windows may be entirely or partially obscured by the active window.

The graphics display system responsible for drawing the windowed image must determine what, if any, data from a window is to be displayed. The system must determine the relative interaction between windows, i.e. whether one window is contained within another, whether the windows are disjoint, or whether some part of the windows overlap. The graphics system could spend considerable processing time drawing to an obscured window.

Graphics systems ideally determine the whether a window is obscured by another window before performing window drawing activities. This can, however, cause a performance penalty due to the need to test the four vertices of the first window against each of the four vertices of the second window—a total of sixteen comparisons. The Sutherland-Hodgman polygon clipping algorithm and Cohen-Sutherland line clipping algorithm are of this type and are described in *Computer Graphics, Principles and Practice*, J. Foley, A. van Dam, S. K. Feiner and J. F. Hughes, Addison-Wesley, 1990.

A system and method for quickly determining the relative interaction of rectangles (most windows are rectangular) is needed to increase the performance of graphics systems.

SUMMARY OF THE INVENTION

The present invention provides a system and method for rapidly determining the relative interaction of rectangles in a graphics system. This method exploits the special geometric nature of isothetic rectangles and is faster than the more general Sutherland-Hodgman clipping algorithm discussed in Foley and van Dam above.

The present invention is directed to a computer implemented method for determining the interaction between rectangles in a graphics system, the rectangles each have four vertices arranged to form an isothetic rectangle. The method performs the following steps: selecting two diagonally opposed vertices of each rectangle; determining relative displacement between a first of the two diagonally opposed vertices of the first rectangle and a first of the two diagonally opposed vertices of the second rectangle; determining relative displacement between a second of the two diagonally opposed vertices of the first rectangle and a second of the two diagonally opposed vertices of the second rectangle; determining a first combined relative displacement based on the first and second relative displacements; testing the first combined relative displacement to determine interaction; if the testing is not determinative: determining third relative displacement between the first of the two diagonally opposed vertices of the first rectangle and the second of the two diagonally opposed vertices of the second rectangle; determining fourth relative displacement between the second of the two diagonally opposed vertices of the first rectangle and the first of the two diagonally opposed vertices of the second rectangle; determining a second combined relative displacement based on the third and fourth relative displacements; testing the first combined relative displacement and the second combined relative displacement to determine interaction.

It is therefore an object of the invention to provide a system and method that rapidly determines the relative relationship among several rectangles.

It is yet another object of the invention to determine relative interaction of rectangles without testing each rectangle vertex against each of the vertices of the other rectangles.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIGS. 6(*a*) and 6(*b*) are illustrations of bounding boxes determined for two graphics primitives.

DETAILED DESCRIPTION

Figure 1:
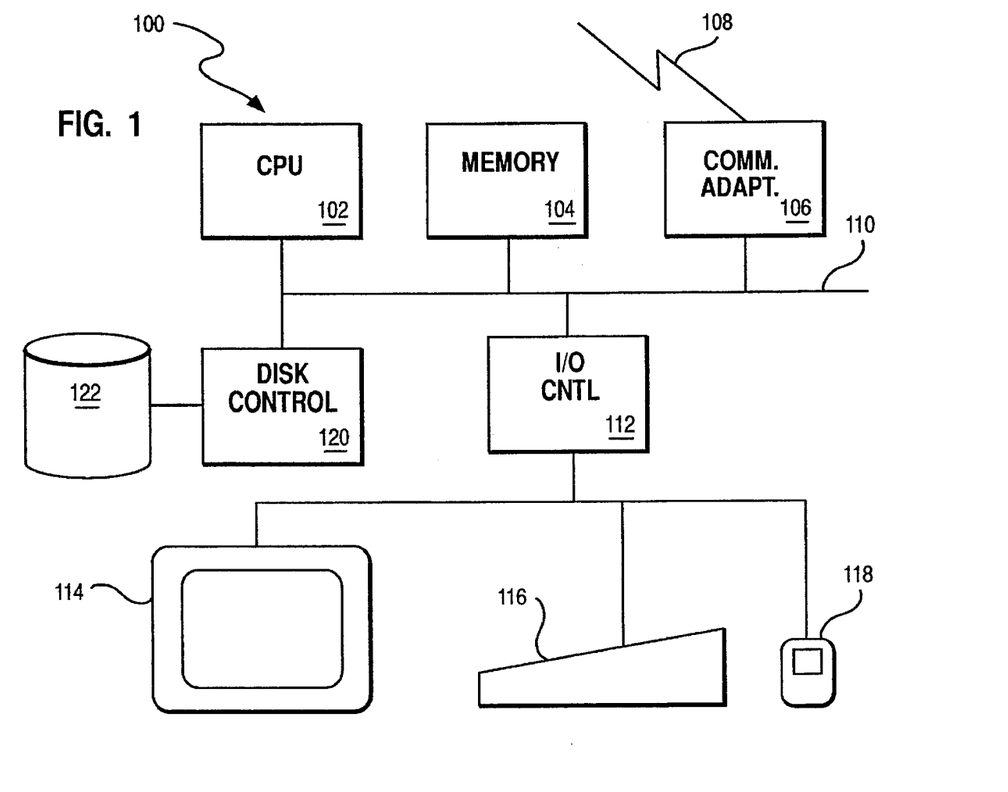
FIG. 1 is a block diagram of a computer system implementing the preferred embodiment of the present invention.

The present invention is implemented in a computer system such as that shown in FIG. 1. The computer system is preferably an IBM RISC System/6000 computer from the IBM Corp. (IBM and RISC System/6000 are trademarks of the IBM Corp.) though any similar workstation, personal computer or mainframe computer could be employed.

The computer system 100 has a processing unit random access memory 104 and permanent storage 122. In addition, an optional communications adapter 106 enables communication with other computer systems. Input/Output controller 112 controls interaction with the video display 114, the keyboard 116 and pointing device 118. Disk controller 120 controls interaction between the processing unit and the permanent storage 122. The options represented here are typical components used in the preferred embodiment. Other components with similar function could replace those shown, for example, a removable diskette or an optical drive could be used in place of a magnetic drive for permanent storage 122 and the processor 102 could be comprised of a number of processing engines in a multiprocessor or parallel processing architecture.

The preferred embodiment is implemented as a computer implemented process operating on computer system 100. Computer instructions from permanent storage 122 are preferably loaded into memory 104 and dispatched for execution on processor 102. In an alternate embodiment the process steps of the present invention are implemented using hardware circuits to form a graphics adapter incorporated in I/O Control 112 (not shown separately on the drawing.)

Figure 2:
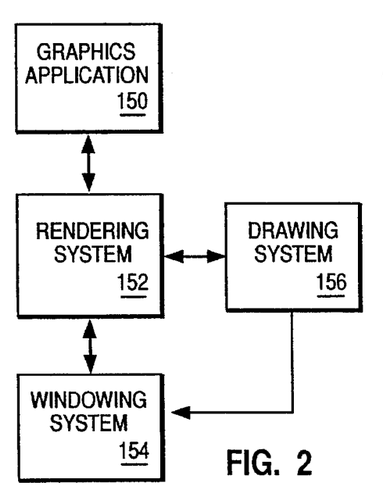
FIG. 2 is a block diagram of a graphics subsystem employing the present invention.

Graphics processing systems typically implement the functions shown in FIG. 2. Graphics application 150 issues graphic drawing commands (graphic primitives) to the rendering subsystem 152. These commands include those for drawing a line or a polygon in a specific window. The Rendering subsystem 152 interprets the commands and causes the Drawing subsystem 156 to draw the requested element in the specified window. Windowing subsystem 154 manages the relationships of the windows and maintains status information such as the number of windows present, the relative priority of each window and which windows are visible.

Figure 3:
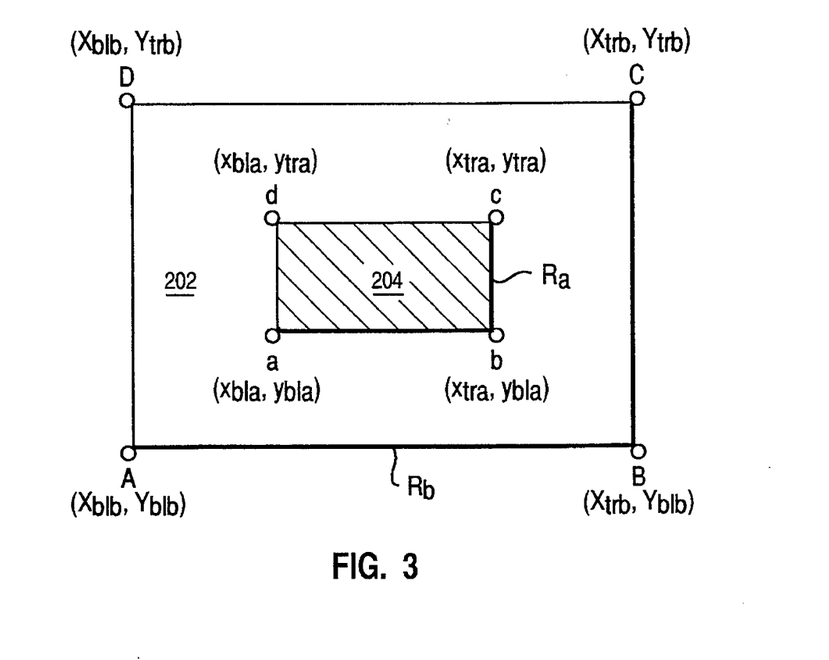
FIG. 3 is an illustration of isothetic rectangles tested by the present invention.

Graphics applications frequently draw graphics primitives such a lines and polygons in isothetic rectangular windows on the display screen. An isothetic rectangle has edges that are either horizontal or vertical. FIG. 3 illustrates two such rectangles, $R_b$ 202 and $R_a$ 204.

The preferred embodiment determines the relationship between the two rectangles based on the bottom left and top right vertices of each rectangle. Rectangle $R_a$ 204 has bottom left and top right vertices of $(x_{bla}, y_{bla})$ and $(x_{tra}, y_{tra})$, respectively. Rectangle $R_b$ has vertices of $(x_{blb}, y_{blb})$ and $(x_{trb}, y_{trb})$, respectively. All coordinates are integers. An alternate embodiments is possible using the bottom right and top left vertices.

A function $\sigma$ can be defined representing the sign function:

$$\sigma(x) = \begin{cases} 1 & \text{if } x > 0 \\ 0 & \text{if } x = 0 \\ -1 & \text{if } x < 0 \end{cases} \tag{1}$$

Hardware arithmetic units typically provide $\sigma$ as a condition bit from comparisons.

The rectangle relationships are determined by evaluating the rectangle overlap function:

$$F(R_a, R_b) = \sigma(x_{bla} - X_{blb}) + \sigma(X_{trb} - x_{tra}) + \tag{2}$$

$$\sigma(y_{bla} - Y_{blb}) + \sigma(Y_{trb} - y_{tra})$$

The antisymmetric nature of $F(R_a, R_b)$ is used to minimize the number of cases to be considered when determining the existing relationships. The following relationships can be detected:

$$F(R_a, R_b) = \begin{cases} 4 & \text{if } R_a \text{ is inside } R_b \\ -4 & \text{if } R_b \text{ is inside } R_a \\ \pm 1 \text{ or } \pm 3 & \begin{cases} \text{if } R_a \text{ and } R_b \text{ share an edge (or part of a} \\ \text{and overlap} \end{cases} \\ 0 \text{ or } \pm 2 & \begin{cases} \text{if } R_a \text{ and } R_b \text{ share an edge (or part of a} \\ \text{and do not overlap} \end{cases} \\ 0 \text{ or } \pm 2 & \text{if } R_a \text{ and } R_b \text{ intersect} \\ 0 \text{ or } \pm 2 & \text{if } R_a \text{ and } R_b \text{ are disjoint} \end{cases} \tag{3}$$

Evaluation of the above data will unambiguously detect the case where $R_a$ contains $R_b$ or vice versa, or where $R_a$ and $R_b$ share an edge and overlap. The other three cases require additional evaluation.

A function G is defined to resolve the final three cases:

$$G(R_a, R_b) = \sigma(X_{trb} - x_{bla}) + \sigma(x_{tra} - X_{blb}) + \tag{4}$$

$$\sigma(Y_{trb} - y_{bla}) + \sigma(y_{tra} - Y_{blb})$$

Equation (4) is a symmetric function and that symmetry can be used to minimize the number of cases to consider. Evaluation of Equation (4) result in values interpreted as follows:

$$G(R_a, R_b) = \begin{cases} 4 & \text{if } R_a \text{ is inside } R_b \\ 4 & \text{if } R_b \text{ is inside } R_a \\ 4 & \begin{cases} \text{if } R_a \text{ and } R_b \text{ share an edge (or part of an} \\ \text{and overlap} \end{cases} \\ 3 & \begin{cases} \text{if } R_a \text{ and } R_b \text{ share an edge (or part of an} \\ \text{and do not overlap} \end{cases} \\ 4 & \text{if } R_a \text{ and } R_b \text{ intersect} \\ 0 \text{ or } 2 & \text{if } R_a \text{ and } R_b \text{ are disjoint} \end{cases} \tag{5}$$

Evaluation of $F(R_a, R_b)$ in all cases and $G(R_a, R_b)$ in a subset of cases allows unambiguous determination of the relationship between two rectangles. A decision table can be constructed identifying these relationships:

| Rectangle Relationship | Value of $F(R_a, R_b)$ | Value of $G(R_a, R_b)$ |
| --- | --- | --- |
| $R_a$ is inside $R_b$ | 4 | n/a |
| $R_b$ is inside $R_a$ | −4 | n/a |
| $R_a$ and $R_b$ share edge and overlap | ±1 or ±3 | n/a |
| $R_a$ and $R_b$ are disjoint | 0 or ±2 | 0 or ±2 |
| $R_a$ and $R_b$ intersect | 0 or ±2 | 4 |
| $R_a$ and $R_b$ share an edge and do not overlap | 0 or ±2 | 3 |

The preferred embodiment employs the above relationship in two inventive processes. The first embodiment is used by the graphics windowing system to determine the relationship between windows. The second embodiment is used in the rendering system to determine whether a particular primitive must be drawn into a possibly obscured window.

Figure 4:
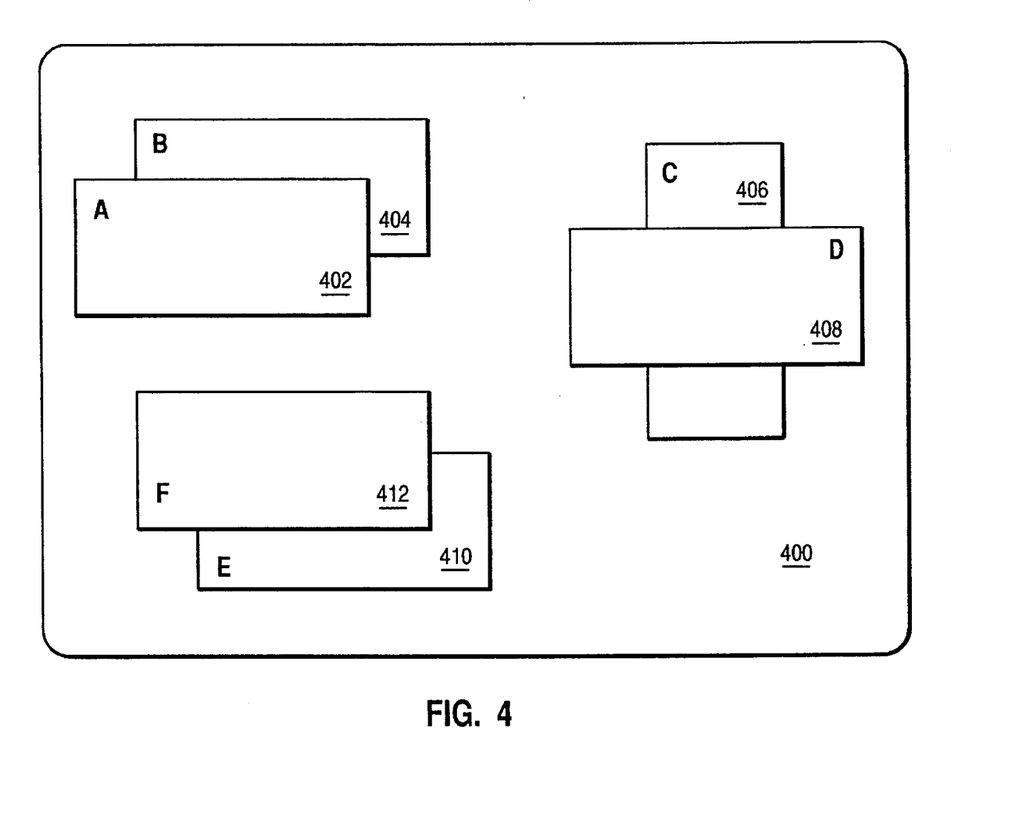
FIG. 4 is an illustration of a display screen with several windows that can be analyzed according to the present invention.

The first preferred embodiment analyzes the relationships between a set of windows managed by a graphics windowing subsystem. FIG. 4 illustrates a number of windows present on display 400. As discussed above, the windowing subsystem maintains status information on the relationships and priorities among the windows whenever window parameters change. The windowing subsystem must be able to quickly determine window status. The windows shown in FIG. 4 would require the comparison of fifteen window pairs so efficiency is important.

Figure 5:
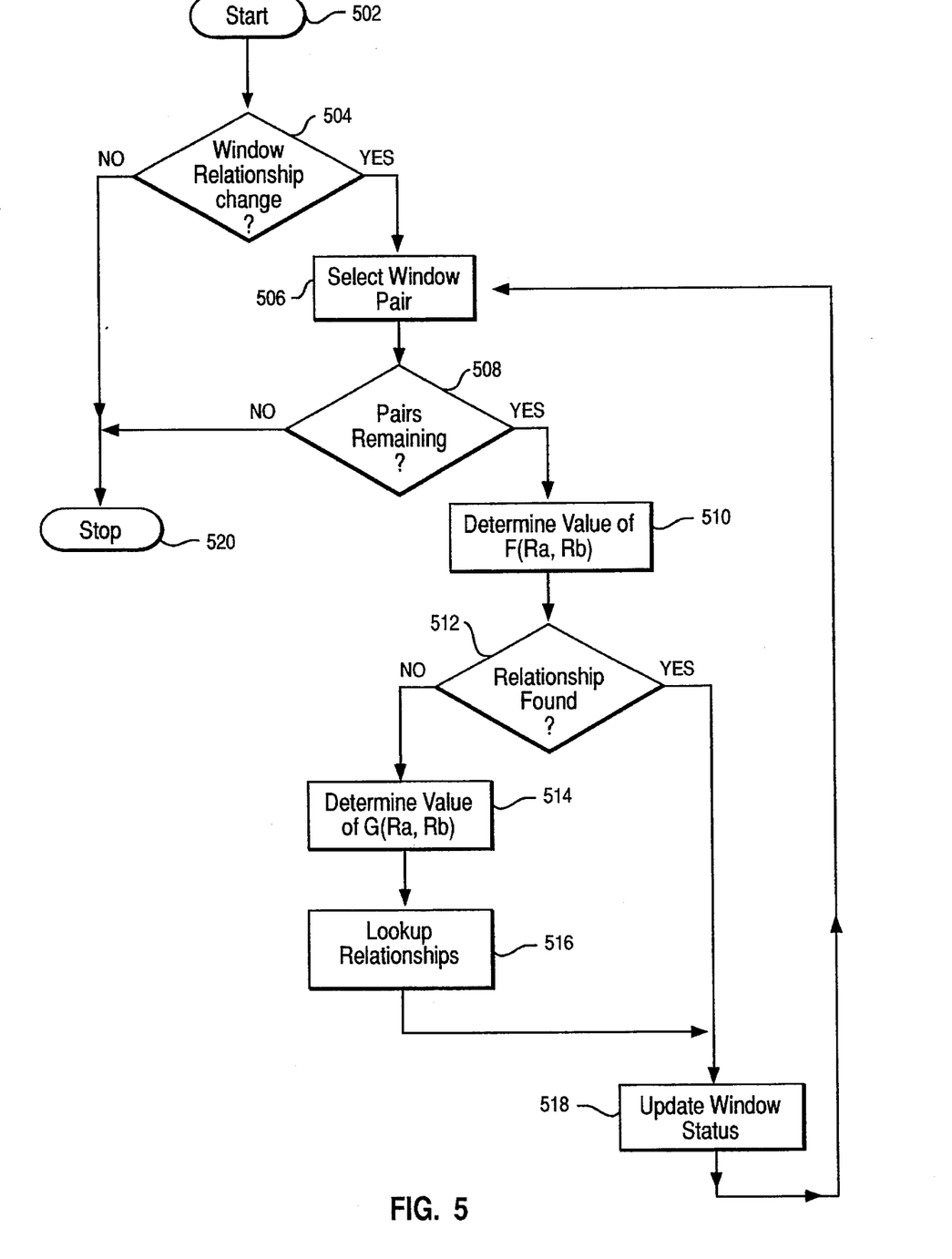
FIG. 5 is a flowchart depicting the process steps of a first embodiment of the present invention.

The process operates according to the steps shown in FIG. 5. The process starts at 502 and immediately proceeds to 504. The Window system tests for a change in window relationships 504. If none, processing terminates at 520. Otherwise, the system selects a window pair for relationship analysis 506. A test is made to determine whether a window pair remains for testing 508, if not, processing terminates 520. If a pair remains, the value of $F(R_a,R_b)$ is determined and tested against the relationship table. If the relationship can be determined from the $F(R_a,R_b)$ value alone 512, the value of $G(R_a,R_b)$ is calculated 514. This value is used to determine the final relationship between the windows 516. The relationship information is used to update the window status 518.

The second embodiment of the present invention is used by the rendering subsystem to determine whether or not to request the drawing subsystem to draw a primitive. System performance can be increased if the drawing subsystem does not process graphic orders that will result in an object that is not in or does not intersect the window into which it is being drawn. Although the drawing system would properly clip the drawn object, the clipping process would be inefficient.

Figure 6A:
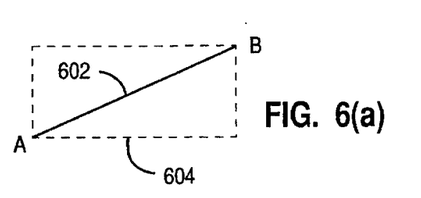
Figure 6B:
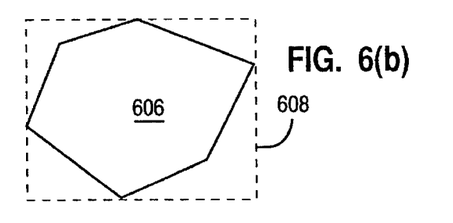

The present invention tests the bounding box of the graphics order object against the window into which it is to be drawn. The bounding box is an isothetic rectangle that fully contains the resulting primitive. For example, FIG. 6(a) illustrates a line segment AB 602. The bounding box 604 contains A and B as vertices and is comprised of horizontal and vertical segments needed to form a rectangle. FIG. 6(b) illustrates a polygon 606 with bounding box 608. The bounding box surrounds the maximum x and y ranges. All points of the primitive are contained within the bounding box and if the box does not intersect the window, no part of the object will.

Figure 7:
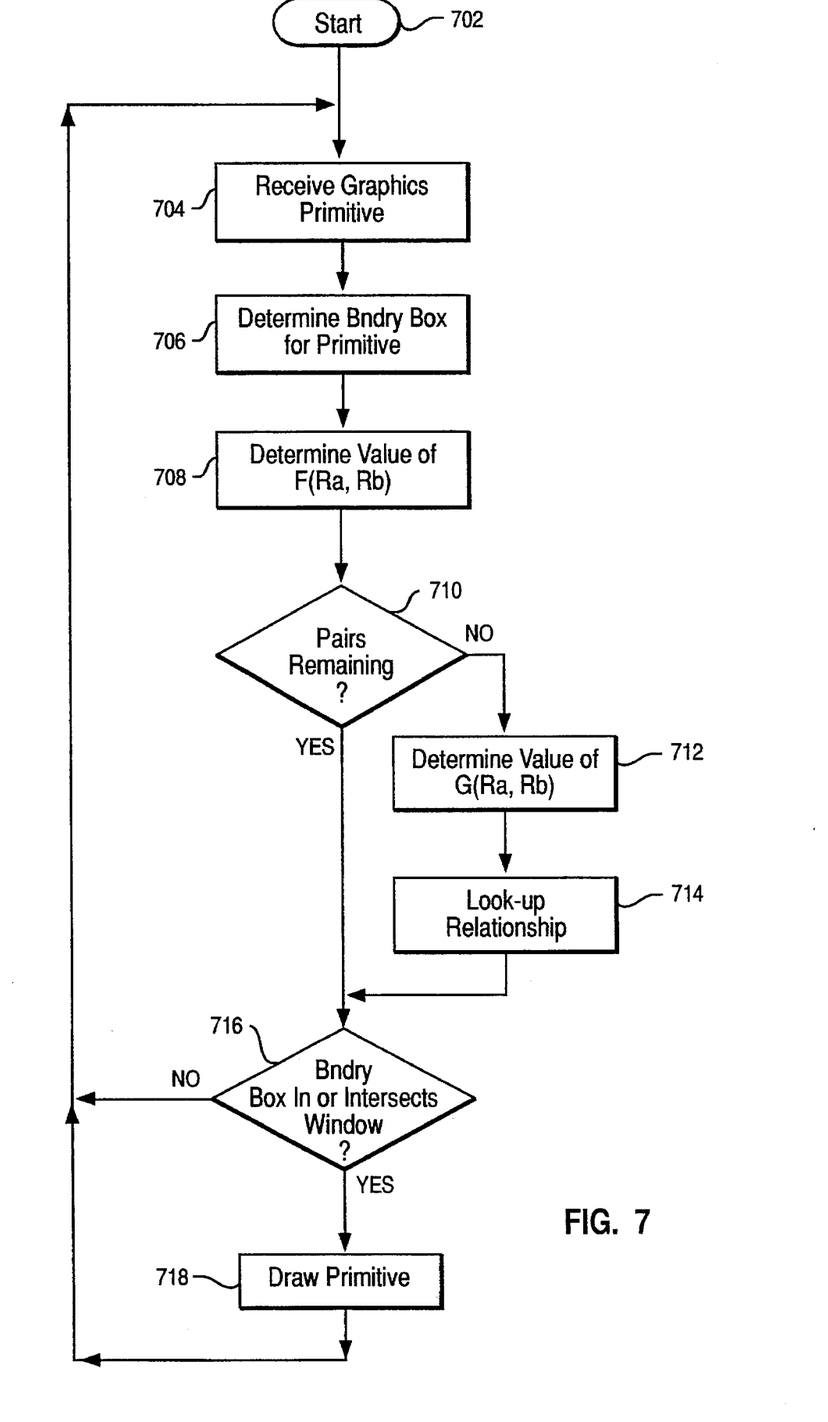
FIG. 7 is a flowchart depicting the process steps of a second embodiment of the present invention.

The process for testing for intersection is illustrated in FIG. 7. The rendering subsystem performs this process in the preferred embodiment. The process starts at step 702 and immediately proceeds to step 704. A graphics order or primitive is received 704 and analyzed. The bounding box for the primitive is constructed 706. The function $F(R_a,R_b)$ for the bounding box and the window into which it is to be drawn is determined 708. If the value of F is not determinative of the relationship 710, then the value of $G(R_a,R_b)$ is calculated 712 and the relationship of the bounding box and the window determined by table lookup based on F and G 714. The relationship is tested 716. If the bounding box is within or intersecting the window the primitive is drawn by the drawing subsystem 718. Otherwise, the primitive is discarded and processing returns to the beginning.

The first and second embodiments of the invention each use the properties of isothetic rectangles to reduce the calculations required to determine the relationship between two rectangles. The calculations and tests are greatly reduced from the prior art methods requiring analysis of the relationship of each of the vertices of both rectangles. These embodiments greatly improve the efficiency of operation of a graphics system.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A computer implemented method for determining visibility of a plurality of windows displayed in a graphics system, the windows each having four vertices arranged to form an isothetic window, the method comprising the steps of:

selecting two diagonally opposed vertices of first and second windows, said selected vertices oriented in a same general alignment, and said vertices representing location values within a display screen;

determining relative displacement between a first of said two diagonally opposed vertices of said first window and a first of said two diagonally opposed vertices of said second window;

determining relative displacement between a second of said two diagonally opposed vertices of said first window and a second of said two diagonally opposed vertices of said second window;

determining a first combined relative displacement based on said first and second relative displacements;

testing said first combined relative displacement to determine the visibility of said first and second windows;

if the testing is not determinative:

determining third relative displacement between said first of said two diagonally opposed vertices of said first window and said second of said two diagonally opposed vertices of said second window;

determining fourth relative displacement between said second of said two diagonally opposed vertices of said first window and said first of said two diagonally opposed vertices of said second window;

determining a second combined relative displacement based on said third and fourth relative displacements; and testing said first combined relative displacement and said second combined relative displacement to determine the visibility of said first and second windows;

displaying said first and second windows on said display screen function of said determined visibility.

2. A method for determining an interaction between two isothetic rectangles to be displayed on a display in a graphics system, each having a left and right side, and a top and bottom, and each having a lower left and upper right vertex, the method comprising the steps of:

determining a first combined relative displacement of the lower left vertices of the two rectangles and the upper right vertices of the two rectangles said vertices representing location values within said display;

determining the relationship of the rectangles if the first combined relative displacement is determinative, otherwise;

determining a second combined relative displacement of the lower left vertex of one rectangle and the upper right vertex of the second rectangle and of the upper right vertex of the one rectangle and lower left vertex of the second rectangle;

determining the relationship of the rectangles based on the first and second relative displacements; and displaying said rectangles on said display as a function of said determined relationship.

3. A computer graphics system for determining interactions between two isothetic rectangles to be displayed on a display in said graphics system, each of said rectangles having four vertices including upper left, upper right, lower left and lower right, said system comprising:

means for determining a first combined relative displacement based upon at most two vertices of said rectangles, said selected vertices oriented in a same general alignment, and said vertices representing location values within said display;

means for determining a relationship between the rectangles if said first combined relative displacement is determinative;

means for determining a second combined relative relationship based upon at most two vertices of said rectangles, said at most two vertices being different than the previously tested two vertices;

means for determining the relationship of the rectangles based on the first and second combined relative displacements; and     displaying said rectangles on said display as a function of said determined relationship.

4. The system of claim 3 wherein said means for determining the relationship of the rectangles comprises a table look-up means stored within said graphics system.

5. A computer program product having a computer readable medium having a computer program recorded thereon in a binary digital format executable by a computer system device, said computer program operable for determining visibility of a plurality of windows displayed on a display screen coupled to said system device, the windows each having four vertices including upper left, upper right, lower left and lower right, said computer program product comprising:

means for determining a first combined relative displacement based upon at most two vertices of said windows, said selected vertices oriented in a same general alignment, and said vertices representing location values within said display screen;

means for determining the visibility between the windows if said first combined relative displacement is determinative;

means for determining a second combined relative displacement based upon at most two vertices of said windows, said at most two vertices being different than the previously tested two vertices;

means for determining the visibility of the windows based on the first and second combined relative displacements; and     means for displaying said first and second windows on said display screen as a function of said determined visibility.

6. The program product of claim 5, wherein the means for determining the visibility of the windows comprises a table look-up means recorded on said medium in a binary digital format executable by said computer system device.

7. In a graphics system, a computer implemented method for drawing a graphics primitive within a window displayed on a display screen coupled to said graphics system, the window having four vertices arranged to form an isothetic window, the method comprising the steps of:

receiving display parameters of said graphics primitive;

constructing a boundary box for said graphics primitive, said boundary box dependent upon said display parameters;

selecting two diagonally opposed vertices of said window and of said boundary box, said selected vertices oriented in a same general alignment, and said vertices representing location values within a display screen;

determining relative displacement between a first of said two diagonally opposed vertices of said window and a first of said two diagonally opposed vertices of said boundary box;

determining relative displacement between a second of said two diagonally opposed vertices of said window and a second of said two diagonally opposed vertices of said boundary box;

determining a first combined relative displacement based on said first and second relative displacements;

testing said first combined relative displacement to determine if any portion of said boundary box is within said window;

if the testing is not determinative:

determining third relative displacement between said first of said two diagonally opposed vertices of said window and said second of said two diagonally opposed vertices of said boundary box;

determining fourth relative displacement between said second of said two diagonally opposed vertices of said window and said first of said two diagonally opposed vertices of said boundary box;

determining a second combined relative displacement based on said third and fourth relative displacements; and         testing said first combined relative displacement and said second combined relative displacement to determine if any portion of said boundary box is within said window; and         drawing said graphics primitive to said screen if any portion of said boundary box is within said window.

8. A data processing system for determining visibility of a plurality of windows displayed on a display screen coupled to said system, the windows each having four vertices arranged to form an isothetic window, the system comprising:

means for selecting two diagonally opposed vertices of first and second windows, said selected vertices oriented in a same general alignment, and said vertices representing location values within said display screen;

means for determining relative displacement between a first of said two diagonally opposed vertices of said first window and a first of said two diagonally opposed vertices of said second window;

means for determining relative displacement between a second of said two diagonally opposed vertices of said first window and a second of said two diagonally opposed vertices of said second window;

means for determining a first combined relative displacement based on said first and second relative displacements;

means for testing said first combined relative displacement to determine the visibility of said first and second windows;

if the testing is not determinative:

means for determining third relative displacement between said first of said two diagonally opposed vertices of said first window and said second of said two diagonally opposed vertices of said second window;

means for determining fourth relative displacement between said second of said two diagonally opposed vertices of said first window and said first of said two diagonally opposed vertices of said second window;

means for determining a second combined relative displacement based on said third and fourth relative displacements; and means for testing said first combined relative displacement and said second combined relative displacement to determine the visibility of said first and second windows; and means for displaying said first and second windows on said display screen as a function of said determined visibility.

9. A data processing system for drawing a graphics primitive within a window displayed on a display screen coupled to said system, the window having four vertices arranged to form an isothetic window, the system comprising:

means for receiving display parameters of said graphics primitive;

means for constructing a boundary box for said graphics primitive, said boundary box dependent upon said display parameters;

means for selecting two diagonally opposed vertices of said window and of said boundary box, said selected vertices oriented in a same general alignment, and said vertices representing location values within a display screen;

means for determining relative displacement between a first of said two diagonally opposed vertices of said window and a first of said two diagonally opposed vertices of said boundary box;

means for determining relative displacement between a second of said two diagonally opposed vertices of said window and a second of said two diagonally opposed vertices of said boundary box;

means for determining a first combined relative displacement based on said first and second relative displacements;

means for testing said first combined relative displacement to determine if any portion of said boundary box is within said window;

if the testing is not determinative:

means for determining third relative displacement between said first of said two diagonally opposed vertices of said window and said second of said two diagonally opposed vertices of said boundary box;

means for determining fourth relative displacement between said second of said two diagonally opposed vertices of said window and said first of said two diagonally opposed vertices of said boundary box;

means for determining a second combined relative displacement based on said third and fourth relative displacements; and means for testing said first combined relative displacement and said second combined relative displacement to determine if any portion of said boundary box is within said window; and means for drawing said graphics primitive to said screen if any portion of said boundary box is within said window.

* * * * *

UNITED STATES PATENT AND TRADEMARK OFFICE
CERTIFICATE OF CORRECTION

PATENT NO.    :   5,522,020

DATED         :   May 28, 1996

INVENTOR(S)   :   Narayanaswami

It is certified that error appears in the above-indentified patent and that said Letters Patent is hereby corrected as shown below:

Column 2, line 56        After "processing unit"
                             Insert --102--

Column 6, line 43        Between "screen" and "function"
                             Insert --as a--

Signed and Sealed this

First Day of July, 1997

Attest:

BRUCE LEHMAN

Attesting Officer          Commissioner of Patents and Trademarks